United States Patent
Obara et al.

[11] Patent Number: 6,050,729
[45] Date of Patent: Apr. 18, 2000

[54] COMPOUND BALL BEARING

[75] Inventors: Rikuro Obara; Katashi Tatsuno, both of c/o Minebae Kabushiki-Kaisha, Japan

[73] Assignee: Minebea Kabushiki-Kaisha, Nagano-ken, Japan

[21] Appl. No.: 08/688,010

[22] Filed: Jul. 29, 1996

Related U.S. Application Data

[63] Continuation-in-part of application No. 08/131,400, Oct. 5, 1993, Pat. No. 5,560,717.

[30] Foreign Application Priority Data

| Oct. 7, 1992 | [JP] | Japan | 293858 |
| Nov. 9, 1992 | [JP] | Japan | 323646 |

[51] Int. Cl.[7] ............................... F16C 19/10
[52] U.S. Cl. ............ 384/613; 384/544; 384/909
[58] Field of Search .................. 384/613, 512, 384/908, 909, 544

[56] References Cited

U.S. PATENT DOCUMENTS

| 4,408,808 | 10/1983 | Redmann, Jr. et al. . | |
| 4,607,182 | 8/1986 | Ballhaus ................................ | 384/512 |
| 4,713,704 | 12/1987 | Voll et al. . | |
| 5,013,947 | 5/1991 | Ide . | |
| 5,045,738 | 9/1991 | Hishida et al. . | |
| 5,048,982 | 9/1991 | Nakanishi ................................ | 384/613 |
| 5,051,004 | 9/1991 | Takeuchi et al. ...................... | 384/512 |
| 5,065,925 | 11/1991 | Ridenour ................................ | 225/78 |
| 5,141,088 | 8/1992 | Kurihara et al. ...................... | 384/512 |
| 5,207,701 | 5/1993 | Ishikawa et al. ..................... | 384/544 |

FOREIGN PATENT DOCUMENTS

| 3224448 | 2/1983 | Germany . |
| 3540363 | 6/1986 | Germany . |

OTHER PUBLICATIONS

Japanese Abstract No. 58–160322, vol. 9, No. 182 (p. 376) (1905), Jul. 27, 1985.
Japanese Abstract No. 63255869, vol. 13, No. 70 (p. 829), Feb. 2, 1989.
Japanese Abstract No. 61–224836, Oct. 6, 1986, Kazuaki Nakamaori.

*Primary Examiner*—Lenard A. Footland
*Attorney, Agent, or Firm*—Lowe Hauptman Gopstein Gilman & Berner

[57] ABSTRACT

A compound ball bearing comprises a bearing assembly including a spindle 1, a sleeve 2 surrounding the spindle 1, and an inner ring 6 fitted on the spindle or an outer ring fitted in the sleeve, and balls 5, 9 provided between the spindle 1 and the sleeve 2, between the spindle and outer ring or between the inner ring 6 and sleeve 2. A base 16 of a motor is formed as a one-piece unit with the spindle. The vibration accuracy of the spindle 1 can be improved.

4 Claims, 2 Drawing Sheets

6,050,729

COMPOUND BALL BEARING

This application is a continuation-in-part of application Ser. No. 08/131,400, filed Oct. 5, 1993, now U.S. Pat. No. 5,560,717, the contents of which are hereby incorporated by reference.

BACKGROUND OF THE INVENTION

1. Field of the Invention

This invention relates to ball bearings mainly used for office automation apparatus motors and components thereof.

2. Description of the Prior Art

A usual spindle motor used for office automation apparatuses, as shown in FIG. 4, comprises a spindle, a hub serving as a rotor of the motor and a base, where the spindle is supported in a ball bearing which comprises an inner and an outer ring provided in a sleeve. These components are individually formed as separate members.

Since the prior art motor components are thus independent parts, the motor has a large number of components. Besides, it is necessary to assemble together these components, leading to a large number of steps involved in the motor manufacture and thus to a high cost of manufacture.

Further, in the prior art ball bearing structure, it is not easy to obtain the vibration accuracy of the spindle, and it is difficult to expect substantial improvement of the vibration accuracy.

SUMMARY OF THE INVENTION

An object of the invention is to reduce the number of components and number of steps of assembling, thus permitting reduction of the cost of manufacture.

Another object of the invention is to provide a compound ball bearing, in which the inner or outer ring can be secured in a proper position by facilitating the pre-loading, thus obtaining improved spindle vibration accuracy.

In the compound ball bearing according to the invention, a base as a motor component is formed as a one-piece structure integral with the spindle as a component of the bearing assembly.

According to the invention, there is provided a compound ball bearing, which comprises a bearing assembly including a stepped spindle having a large diameter portion and a small diameter portion, a sleeve surrounding said spindle, an inner ring fitted on the small diameter portion of said spindle and having an outer race, balls in a first ball row being provided between said outer race of said inner ring and a corresponding first inner race formed in said sleeve, and said large diameter portion of said spindle formed with an outer race for a second ball row, balls in said second ball row being provided between said outer race and a corresponding second inner race formed in said sleeve, said spindle being integrally formed as a one-piece unit with a base of a motor.

According to the invention, there is also provided a compound ball bearing, which comprises a bearing assembly including a spindle, a sleeve surrounding said spindle, first balls provided between a first outer race formed on said spindle and a corresponding first inner race formed in said sleeve, and second balls provided between a second outer race formed on said spindle and a corresponding second inner race formed in said sleeve, said spindle being integrally formed with a base as a one-piece unit of a motor.

According to the invention, there is also provided a compound ball bearing, which comprises a bearing assembly including a spindle, a sleeve surrounding said spindle, a first outer ring and a second outer ring fitted in said sleeve, first balls provided between a first outer race formed on said spindle and a corresponding first inner race formed in said first outer ring, and second balls provided between a second outer race formed on said spindle and a corresponding second inner race formed in said said second outer ring, said spindle being integrally formed with a base as a one-piece unit of a motor.

DESCRIPTION OF THE PREFERRED EMBODIMENTS

Now, the invention will be described in conjunction with embodiments thereof illustrated in the accompanying drawings.

Figure 1:
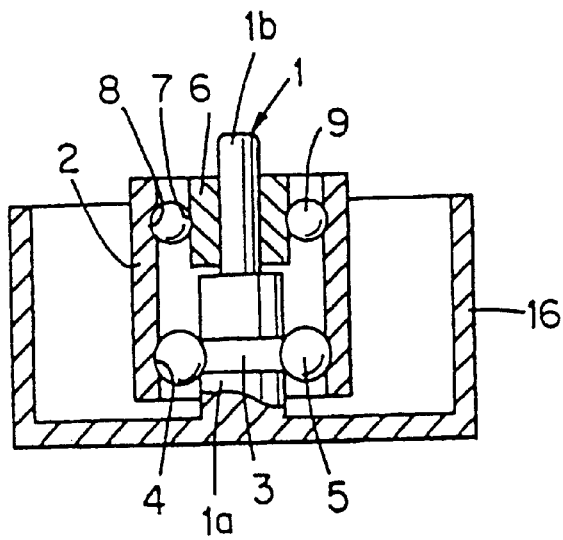
FIG. 1 is a sectional view showing a first embodiment of the invention.

FIG. 1 shows a first embodiment of the compound ball bearing according to the invention. Referring to the Figure, there is shown a bearing assembly for retaining bearing balls provided in two rows between a spindle 1 and a sleeve 2.

The spindle 1 is stepped, having a large diameter portion 1a and a small diameter portion 1b. An inner ring 6 is fitted on the small diameter portion 1b of the spindle 1, and balls 9 are provided in a first row between an outer race 7 formed on the outer periphery of the inner ring 6 and a corresponding first inner race 8 formed in the inner periphery of the sleeve 2.

The large diameter portion 1a has an outer race 3 for a second ball row, while the sleeve 2 has a second inner race 4 corresponding to the outer race 3 of the spindle 1. Balls 5 in the second row are provided between the outer race 3 of the spindle 1 and the second inner race 4 of the sleeve 2.

In the embodiment of FIG. 1, the inner ring 6 is fitted loosely on the spindle 1 and set in a proper position with a pre-load applied from its upper end face in the Figure. Then it is secured to the spindle by using an adhesive.

Further, in this embodiment of FIG. 1, a base 16 of a motor is provided by a process such as machining or molding such that it is integral with the lower end of the large diameter portion 1a of the spindle 1.

Figure 2:
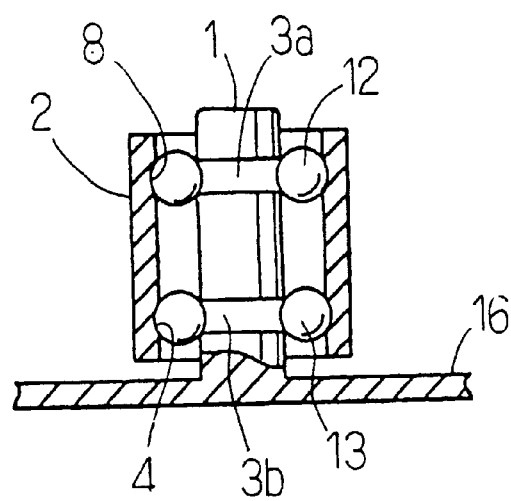
FIG. 2 is a sectional view showing a second embodiment of the invention.

FIG. 2 shows another embodiment of the invention, in which the spindle 1 is straight and has a first outer race 3a and a second outer race 3b on its outer periphery. The sleeve 2 has a first inner race 8 and a second inner race 4 in its inner periphery.

Balls 12 are provided in a first row between the first outer race 3a of the spindle 1 and the first inner race 8 of the sleeve 2. Balls 13 are provided in a second row between the second outer race 3b of the spindle 1 and the second inner race 4 of the sleeve 2.

The base 16 of a motor is also provided by a process such as machining or molding such that it is integral with the lower end of the spindle 1.

Figure 3:
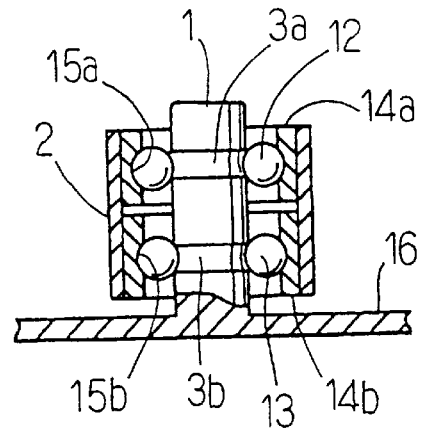
FIG. 3 is a sectional view showing a third embodiment of the invention.
Figure 4:
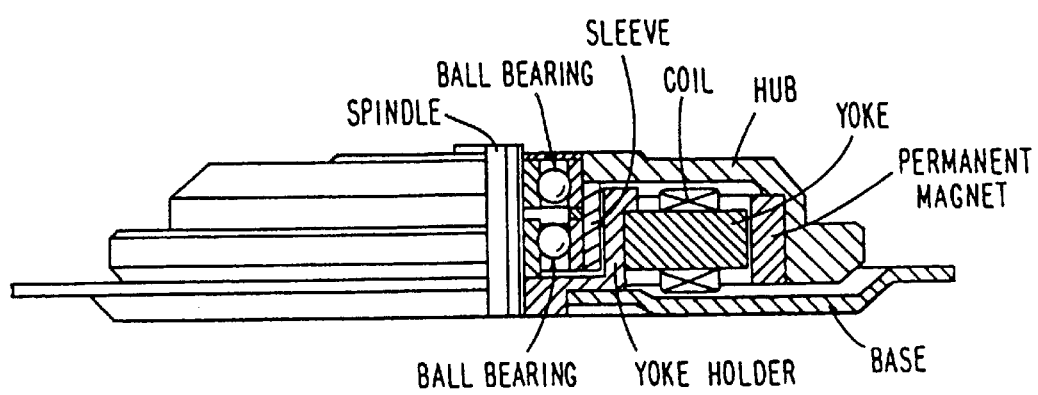
FIG. 4 is a view, partly in section, showing a motor using a prior art drawing.

FIG. 3 shows a further embodiment, in which a first outer ring 14a and a second outer ring 14b are fitted in the sleeve 2.

The balls 12 in the first row are provided between the first outer race 3a of the spindle 1 and a corresponding inner race 15a formed in the inner periphery of the first outer ring 14a. The balls 13 in the second row are provided between the second outer race 3b of the spindle 1 and a corresponding inner race 15b formed in the inner periphery of the second outer ring 14b.

Further, in this embodiment of FIG. 3, the base 16 of a motor is also provided by process such as machining or molding such that it is integral with the lower end of the spindle 1.

In the embodiments of FIG. 1 and FIG. 3, the inner or outer ring can be readily pre-loaded by applying a pressure to it in the axial direction. The inner or outer ring thus can be secured in a proper position to obtain a highly accurate ball bearing.

Each ball is suitably made of high carbon chromium bearing steel.

According to the invention, a base of a motor is formed as a one-piece unitary structure integral with the spindle constituting the bearing assembly. Thus, unlike the prior art bearing structure in which the base is separate from the bearing assembly, by using the present invention it is possible to readily assemble parts when manufacturing a motor, to obtain efficient assembling by using machines and generally to reduce the cost of motor manufacture, these merits being greatly beneficial in industrial production. Further by previously forming, a base as a one-piece unit with the spindle constituting the bearing assembly, the motor manufacture or motor component assembly can be carried out without need for centering of the spindle with respect to any of the components noted above, and it is thus possible to provide a motor or the like, which is free from shaft vibration and which has a high accuracy of rotation.

What is claimed is:

1. A compound ball bearing comprising:

a bearing assembly including a spindle (1), a sleeve (2) surrounding said spindle (1) and a double-row of balls (5), (9), said spindle being a stepped spindle (1) having a large diameter portion (1a) and a small diameter portion (1b), said double-row of balls comprises a first row of balls (5) and a second row of balls (9), said balls (9) of the first row being provided between an outer race 7 formed on an inner ring (6) fitted on said small diameter portion (1b) of said spindle (1) and a corresponding first inner race (8) formed in said sleeve (2), said balls (5) of said second row being provided between an outer race (3) formed on said large diameter portion (1a) of said spindle (1) and a corresponding second inner race (4) formed in said sleeve (2), said spindle (1) being integrally formed as a one-piece unit with a base (16) of a motor.

2. The compound ball bearing of claim 1, wherein said base is a stationary part of the motor and said spindle is integrally formed therewith, said spindle being stationary and said sleeve mounted in rotational relationship with respect to said spindle.

3. The compound ball bearing of claim 2, wherein said sleeve surrounds said spindle.

4. The compound ball bearing of claim 1, wherein said first inner race (8) and said second inner race (4) are each directly formed in said sleeve (2).

* * * * *